No. 883,195. PATENTED MAR. 31, 1908.
D. HALL.
SYSTEM OF DISTRIBUTION.
APPLICATION FILED FEB. 7, 1906.
2 SHEETS—SHEET 1.
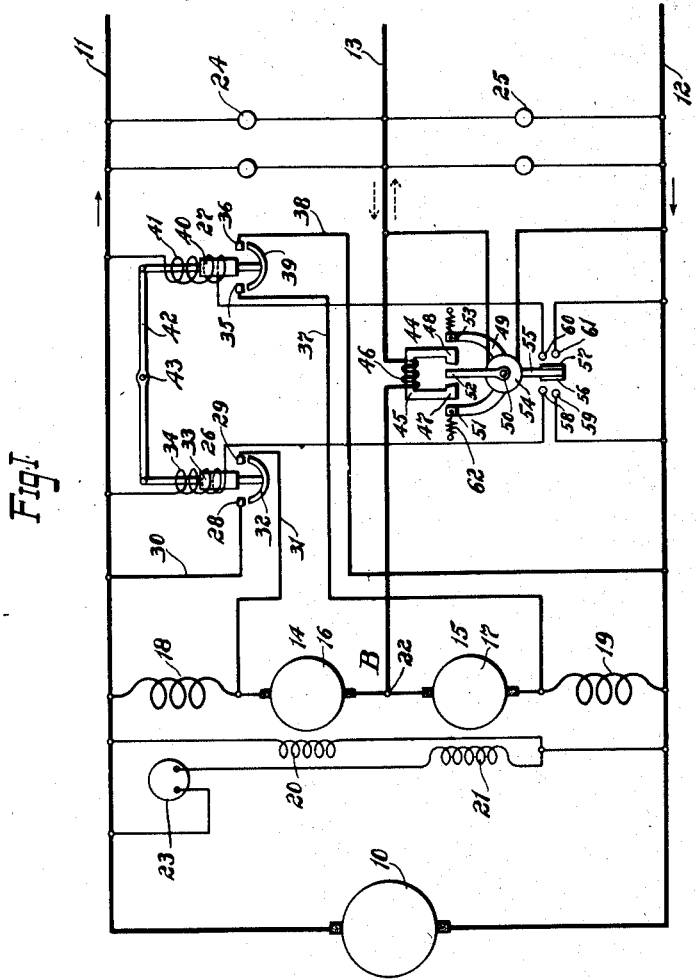
WITNESSES:
George J. Schwartz
Fred J. Kinsey
INVENTOR:
David Hall.
BY
Chas. E. Lord
ATTORNEY.

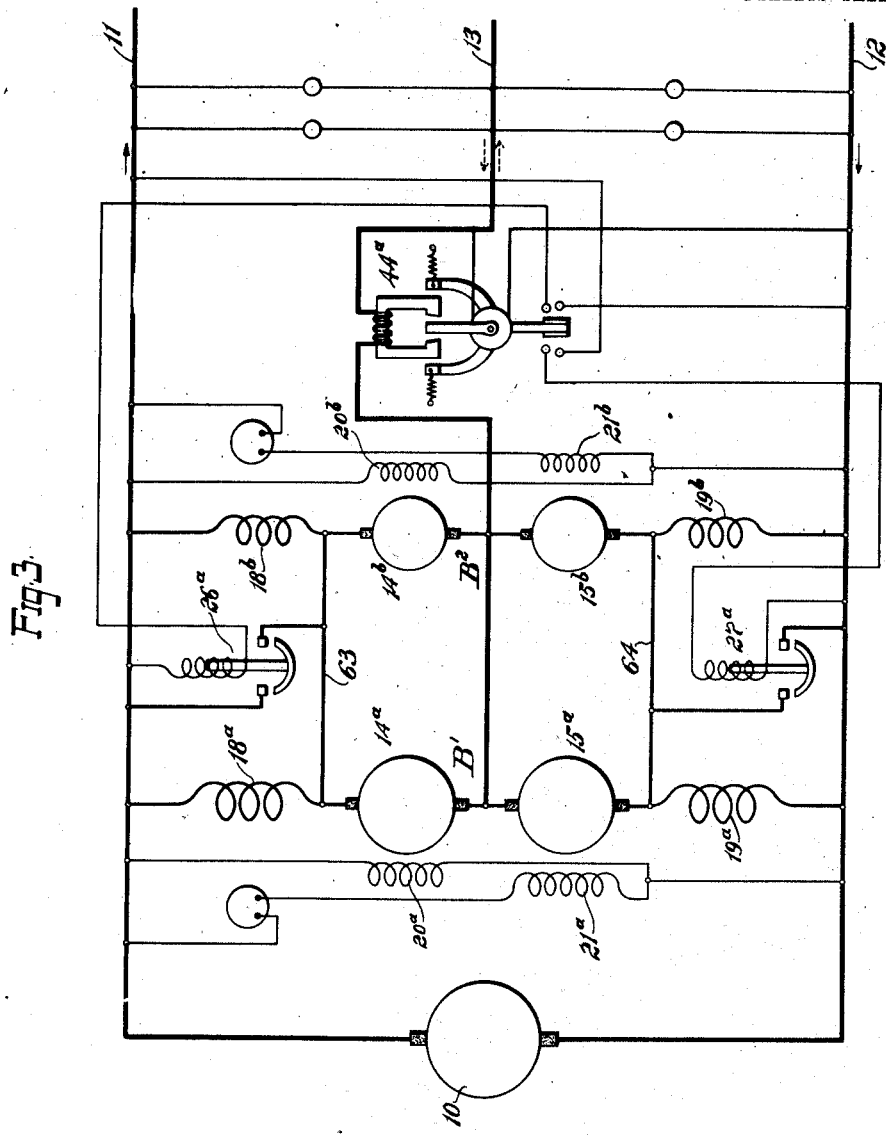

UNITED STATES PATENT OFFICE.

DAVID HALL, OF NORWOOD, OHIO, ASSIGNOR TO THE BULLOCK ELECTRIC MANUFACTURING COMPANY, A CORPORATION OF OHIO.

SYSTEM OF DISTRIBUTION.

No. 883,195.     Specification of Letters Patent.     Patented March 31, 1908.

Application filed February 7, 1906. Serial No. 299,863.

*To all whom it may concern:*

Be it known that I, DAVID HALL, citizen of the United States, residing at Norwood, in the county of Hamilton and State of Ohio, have invented certain new and useful Improvements in Systems of Distribution, of which the following is a full, clear, and exact specification.

My invention relates to multiple-voltage systems of distribution having any number of feeder conductors and circuits, and particularly to three-wire systems in which the voltages between the main conductors and the compensating conductor are equal, called the symmetrical three-wire systems, or in which the voltages are unequal, called the unsymmetrical three-wire systems.

It is customary to employ in a multiple-voltage system a balancer, as it is commonly called in the art, consisting of two or more dynamo-electric machines connected across the main conductors or legs of the system and to the neutral or compensating conductor or conductors. As is well known, when the currents in the branches of the system are equal or balanced, said dynamo-electric machines run as motors without load and with slight losses. When said currents become unequal, current flows through one or more compensating conductors, and one or more of said machines are driven as generators to supply current to the branch or branches having the heavier current or currents to maintain the voltages at substantially their proper values.

On account of the inherent regulating qualities of compound-wound machines, it is desirable to employ compound-wound dynamo-electric machines in the balancer set, in order that upon unbalancing of the currents the generator or generators of the balancer set may supply current at increased voltage as such unbalancing increases. Since the current through the armature and series field winding of one of the machines of a balancer is in opposite directions when said machine is acting as a generator and as a motor, and since the series and shunt fields of a machine must be cumulative when the machine acts as a generator, it follows that the fields are differential when the same machine acts as a motor. In other words, the machines acting as generators have cumulative fields and the machines acting as motors have differential fields, and the degree of compounding action depends on the value of the current in the compensating conductor.

It is well known that a motor having differentially wound fields may race or run away on current overload. Heretofore on account of the differential action of the fields of the motor, compound-wound balancers have been unsuccessful when the unbalancing of the currents is considerable, because of their unstable action and the danger that the machines of the balancer will "run away." When the currents in all the branches of the system are equal and all the machines are running as motors, the field of each machine is due chiefly to its shunt field winding. Now as the currents become unequal, the field of the motor due to the shunt field winding is weakened by the current in the series field winding, which is now greater than when the currents were equal. The result is that the speed of the motor is increased, increasing the voltage of the generator to which it is connected. Now if the difference in the currents becomes greater, the differential field action of the motor increases and its speed becomes correspondingly greater. The result is that the voltage impressed upon the lamps or other translating devices on the branch or branches carrying the greater currents becomes so great that said translating devices may be destroyed or the balancer may be destroyed on account of its speed.

One of the objects of my invention is to provide means whereby I may obtain the cumulative field action of the machine acting as a generator without the differential field action of the machine acting as a motor, whereby the unstable action is avoided. A further object is to provide means whereby two or more compound-wound balancers may be operated in parallel on the same system.

In carrying out my invention, I provide a balancer which consists of compound-wound dynamo-electric machines which are connected to the conductors of a multiple-voltage distributing system, and provide means for automatically cutting out of service one of the field windings of one of said machines when the currents in the branches of the system become unequal.

In another aspect, my invention consists in a multiple-voltage system of distribution having a balancer set including dynamo-electric machines for supplying the balancing current when the currents in the branches of the system are unequal, each of said machines having a field winding in series with its armature and a field winding connected across the main conductors in shunt to the armature, and means responsive to a passage of current or a reversal of current in a compensating conductor for automatically cutting out of service the series winding of the motor or machine connected to the compensating conductor on that side of the latter which carries the lesser current, in other words for changing such machine to a shunt motor, the generator or machine connected on the other side of said compensating conductor remaining compound-wound.

More specifically considered, my invention consists in a three wire system of distribution having two main conductors forming the legs of the system, and a compensating, balancing or neutral conductor, a plurality of balancers connected in parallel across the legs of the system and to the compensating or balancing conductor, each balancer comprising two dynamo-electric machines, the armatures of which are connected across the legs of the system, series windings for the said machines connected in circuit with the armatures, a shunt winding for each machine connected to the legs of the system, means for short-circuiting the series winding of the machines on either side of the compensating or balancing conductor, and means responsive to the unbalancing of the currents in the two sides of the system for operating said means to short-circuit the series windings of those machines acting as motors.

My invention still further consists in the combinations and arrangements of parts described in the specification and set forth in the appended claims.

For a better understanding of my invention, reference is had to the accompanying drawing, in which Figure 1 shows a portion of a three-wire distributing system having my invention applied thereto; Fig. 2 is a perspective of the preferred form of the reverse current relay employed in carrying out my invention; and Fig. 3 is a portion of a three wire distributing system having my invention applied thereto, two balancers being connected in parallel across the legs of the system.

Referring now to the figures of the drawing, I have shown at 10 a source of current, in this case a single generator. The main conductors or legs of the three-wire distributing circuit are shown at 11 and 12 respectively and the neutral, compensating or balancing conductor is shown at 13. The balancer set B, in Fig. 1, consists of two dynamo-electric machines 14 and 15, having armatures 16 and 17, and series field windings 18 and 19, the two field windings 18 and 19 and the two armature windings being connected in series across the main conductors 11 and 12. The machines are also provided with shunt field windings 20 and 21, also connected across the conductors 11 and 12. The neutral, compensating or balancing conductor 13 is connected to a common connection of the two armatures 22, the differences in potential between which and either leg of the system is predetermined and may be equal or unequal depending on whether the system is a symmetrical or an unsymmetrical one. However, merely for ease of description, the system will be assumed below to be symmetrical. The armatures of the two dynamo-electric machines are intended to be mechanically connected and will preferably be mounted on the same shaft so as to rotate in unison. In series with one of the shunt field windings 21, is the rheostat 23, by means of which the relative values of current in the two shunt windings 20 and 21 can be adjusted. Translating devices, in this case shown as lamps 24 and 25, are connected between the conductor 11 and the neutral or compensating conductor 13 and between the latter and the conductor 12.

Assuming that a greater number of lamps are connected between the conductors 11 and 13 than between conductors 13 and 12, the dynamo-electric machine 15 would act as a motor and the machine 14 as a generator, current passing from the neutral conductor 13 through the motor armature 17, to conductor 12, and through the generator armature 14 to conductor 11, the motor driving the generator so as to supply current to the translating device 24 in proportion to the difference in the loads, so as to maintain the voltages between the main conductors and the compensating conductor at the proper values. When the loads are equal, the value of the current passing through the series fields and armatures is very small and hence the differential field action is not considerable. When, however, the loads become unbalanced the differential field action in the motor becomes much larger, the effect of the series field winding, which opposes the shunt field winding, depending upon the difference in the loads, and hence on the current flowing in the neutral or compensating conductor. As was explained above the differential field action might result in the translating devices between the conductors 11 and 13 being destroyed, or the apparatus itself wrecked on account of its speed. In order that I may avoid this differential field action in the motor of the balancer when the loads are unequal, I provide means for temporarily cutting out of service the series field winding of either machine when it acts as a motor while the unbalanced condition of the loads continue, so as to change that machine from a compound-wound machine to a shunt wound machine, the generator of the balancer set remaining a compound-wound machine and having cumulative fields. This I can accomplish preferably by short-circuiting the series field winding of that machine which acts as a motor when the loads are unbalanced, and by restoring said field winding when such lack of balance ceases. I may, however, instead of short-circuiting the series winding of the machine acting as a motor, employ any other suitable means for rendering it inoperative or nullifying its effect, as opening its circuit entirely and providing another path for the armature current.

The short-circuiting devices consist chiefly of two solenoid switches 26 and 27, the former being employed for short-circuiting the series field winding 18 of the machine 14 on the one side of the system, and the latter for short-circuiting the series field winding 19 of the machine 15 on the other side of the system. Switch 26 has two stationary contacts 28 and 29 connected respectively by conductors 30 and 31 to the main conductor or leg 11, and to a point between the series field 18 and the armature 16 of machine 14. These two contacts are adapted to be bridged and hence the short-circuit completed by a bridging contact 32 connected to a core 33 of a solenoid having a coil 34. Switch 27 has two stationary contacts 35 and 36, connected respectively by conductors 37 and 38 to a point between the armature 17 of the machine 15 and its series field 19, and to the main conductor or leg 12 of the system. These contacts are adapted to be bridged and hence the short-circuit of field 19 completed by a bridging contact 39 connected to the core 40 of a solenoid having a coil 41. As is shown in Fig. 1 the cores of the solenoids are connected by a bar or rod 42, pivoted at 43. The object of this bar is to assure the closing of only a single switch at a time.

The solenoid switches 26 and 27 may be controlled in any suitable manner. In this case, a reverse current relay 44, shown in perspective in Fig. 2 is employed for that purpose. This relay consists of a rectangular soft iron core 45, having a series coil 46 in the neutral or compensating conductor 13 and two opposite poles 47 and 48, and a core 49 pivoted at 50 having three legs or poles 51, 52 and 53, and a potential coil 54 connected in this case across the compensating conductor 13 and leg 12 of the system. The movable member of the relay has a depending arm 55, having at its lower end two contact faces 56 and 57, adapted to bridge when thrown to the left, two stationary contacts 58 and 59, and when thrown to the right, two contacts 60 and 61. As is clear from Fig. 2, the legs of the core 49 are so bent that their ends are in the same plane and in the plane of the poles 47 and 48 of the core 45. Since the core 49 is provided with the potential coil 54, it will always be magnetized in the same direction, for the reason that the direction of the current through the coil is fixed. Core 44, however, is only energized when the loads are unbalanced and current flows along the compensating conductor 13, and the direction of the magnetic lines through the core and hence the polarity of the poles is determined by the direction of the current in the conductor 13.

When the loads on the two sides of the system are balanced and the core 45 is de-energized, the movable core 49 is held in its central or mid position by springs 62. When the core is energized in one direction, the movable core is attracted and moved in one direction and hence the depending arm bridges one pair of contacts 58 and 59, and when the core is energized in the opposite direction the core is attracted in the opposite direction and hence the depending arm bridges the other pair of contacts 60 and 61.

Coil 34 of solenoid switch 26, is connected to conductor or leg 11, and to the relay contact 58, the other contact 59 of the pair being connected to the opposite leg 12. Coil 41 of solenoid switch 27 is connected to leg 11 and to relay contact 60, the other contact 61 of that pair being connected to leg 12. Thus when the circuit through either coil is completed, that coil is subjected to the full voltage of the system.

The operation will now be explained more in detail. When the loads on the two sides of the system are equal or balanced, there is no passage of current along the neutral or compensating conductor 13, and both machines 14 and 15 run at constant speed as motors with slight losses. With equal loads on both sides of the system, the core 45 is de-magnetized and the movable core 49 is held in its central or mid position by the springs 62. When however, the loads on the two sides of the system become unequal, current flows along the compensating conductor 13, and that machine of the balancer on the less heavily loaded side drives the machine on the more heavily loaded side as a generator to supply the balancing current to the lamps or other translating devices and to maintain the differences in potential between the conductor 13 and the two legs of the system at substantially their predetermined values. When current passes through the conductor 13, coil 46 is energized and core 45 is magnetized in one direction or the other, depending upon the direction of the current in conductor 13. Core 45 attracts core 49 and the latter is moved in one direction or the other, so that the depending arm 55 bridges one pair of contacts completing the circuit through one of the coils of the short-circuiting switches. The coil which is energized attracts its core, and the bridging contact connected thereto bridges one pair of contacts 28—29 or 35—36 and the short-circuit is completed around one of the series coils 18 or 19.

Assume by way of example, that a greater load is between the conductors 11 and 13 than between the conductors 13 and 12, and current passes along the conductor 13 in the direction indicated by the dotted arrow above the conductor. The machine 15 of the balancer then drives machine 14 as a generator, which then supplies current to the more heavily loaded side to an extent depending upon the difference in the loads to maintain the potential of the conductor 13 at the proper value relative to that of the conductors 11 and 12. If the coils of the reverse current relay are properly wound and connected, the legs of the movable core are moved to the left and the depending arm 55 moved to the right so as to bridge contacts 60 and 61, closing the circuit of the coil 41 of the short-circuiting switch 27. Core 40 of the switch is quickly moved upward until the contacts 35—36 are bridged by the movable contact 39 completing the short-circuit through the conductors 37 and 38 around the series field coil 19. This motor, as is seen, has been converted from a compound-wound machine to a shunt motor while the generator 14 continues to be a compound-wound machine, its field windings being cumulative. If the resistance of the conductors 37—38 is sufficiently small very little current passes through the series field 19. The reverse current relay will remain in the position just described and the field 19 will continue to be shunted by the conductors 37 and 38 as long as the load between conductors 11 and 13 is greater than the load between conductors 13 and 12, or until the loads become so near equal that the attraction between the poles of the cores of the relay is less than the pull of the spring 62. By properly adjusting the springs 62 the relay can be made to operate at any desired value of current in conductor 13, and hence at any desired unbalancing of the loads. This is an important feature for the reason that it may not be desired that the relay operate until there is a certain predetermined difference in the loads. If now, the loads are made equal, the movable member of the relay will return to its mid position. If the load on the opposite side of the system or between the conductors 13 and 12 becomes greater than between conductors 11 and 13, the movable member of the relay is moved in the opposite direction to that described above so as to close the switch 26 and to short-circuit the series coil 18 of the machine 14. In this case, current passes along the balancing conductor 13 in the direction indicated by the dotted arrow below conductor 13. If the balancing current supplied by one or the other of the machines is insufficient, it can be increased to the desired amount by changing the relative resistances in the circuits of the shunt coils 20 and 21, by means of the rheostat 23.

Under some circumstances, it may be desired to have the difference in the loads on the two sides of the system considerable at certain periods, and again at other periods, to have the difference in the loads very slight. Although the time during which the loads are greatly unbalanced may be small, and at all other times the loads may be equal or only slightly unbalanced, it is necessary to provide a balancer having machines of sufficient size to meet the requirements of the extreme condition of the unbalancing of the loads. If only a single balancer is employed, it will be necessary to drive at all times much larger machines than would ordinarily be necessary to supply the balance of current. In order to reduce to a minimum the losses in operating a balancer when the difference in the unbalancing varies greatly at different times, I connect in parallel to the system a plurality of balancers, in this case two, of different sizes or capacities. When the unbalancing is slight, only the smaller balancer set need be employed to supply the balancing current, the larger balancer remaining idle. When however, the unbalancing of the loads becomes so great that the smaller set cannot supply sufficient current to maintain the lamps or other translating devices on the more heavily loaded side at the proper voltage, the larger set is brought into service and the smaller balancer is cut out. If the larger balancer set is unable to supply sufficient current, both machines are brought into service at the same time and operate on the same system in parallel.

If two or more balancers, each consisting of two compound-wound dynamo-electric machines, are connected and operated in parallel on the same system, the danger to the lamps and to the machines themselves due to the differential field action of the motors, when the loads are unbalanced, is greater than when a single balancer is employed. This is probably due to the fact that the generator of the larger balancer may, in case of increase of speed of the larger balancer over the smaller balancer, supply current to the generator of the smaller balancer, changing it to a motor and increasing the speed of that balancer. Thus the operation would be very unstable, the function as balancers would be lessened, and the danger to the lamps and machines would be increased. If the series fields are short-circuited there is less danger of the speed of one balancer becoming greater than the speed of the other balancer. My invention therefore has a special utility when applied to balancers operating in parallel.

In Fig. 3 I have shown a three wire system to which two balancers are connected in parallel, means being provided for short-circuiting the series windings of those machines operating as motors when the loads are unbalanced. In this figure, two balancers B' and B², each consisting of two dynamo-electric machines 14ª, 15ª and 14ᵇ, 15ᵇ are connected to the three main conductors 11, 12 and 13, as in the case first described. The machines of balancer B' are provided respectively with series windings 18ª and 19ª, and with shunt windings 20ª and 21ª, and the machines of balancer B² are provided respectively with series windings 18ᵇ and 19ᵇ, and with shunt windings 20ᵇ and 21ᵇ. Machines 14ª and 14ᵇ are connected by an equalizer 63, and machines 15ª and 15ᵇ are connected by an equalizer 64. Two switches 26ª and 27ª are employed for short-circuiting the series windings of the machines, as in the case previously described. In this case, one switch and the conductors connected thereto short circuits the series windings of the two machines on one side of the compensating conductor. The stationary contacts of switch 26ª are connected respectively to the leg 11 and to the equalizer 63, which is connected to the machines 14ª and 14ᵇ at points between the series field windings and the armatures, and the stationary contacts of switch 27ª are connected respectively to equalizer 64 and to the leg 12 of the distributing system. The switches in this case are not shown joined by a pivoted bar as shown in Fig. 1, though such a bar may be used if desired. A reverse current relay 44ª, similar in all respects to the relay first described, completes the circuit through either solenoid coil of switches 26ª and 27ª when the loads are unbalanced, or when conductor 13 carries current to or from the lamps. When the load between conductors 11 and 13 is greater than the load between conductors 13 and 12, series coils 19ª and 19ᵇ of machine 15ª and 15ᵇ are short-circuited by switch 27ª, in the manner already explained, and when the greater load is on the other side of the system, series coils 18ª and 18ᵇ are short-circuited by switch 26ª.

Although the foregoing description has been especially directed to the symmetrical three wire multiple-voltage system, the same arrangement is applicable without change to the unsymmetrical three wire system. Indeed, it is not limited to three wire systems, for it may be applied with equal effect to a system having more than three wires, in which case the balancer would consist of more than two dynamo-electric machines.

It is evident that many changes may be made in the details and connections without interfering with the main features of my invention. It is to be understood that all machines and conductors may be provided with the necessary switches and circuit breakers commonly employed for convenient connection and disconnection. I aim in my claims to cover all modifications which do not involve a departure from the spirit and scope of my invention.

What I claim as new and desire to secure by Letters Patent is:—

1. In a multiple voltage system of distribution, more than two conductors, a balancer including a plurality of compound-wound dynamo-electric machines connected to said conductors, and means for automatically cutting out of service one of the field windings of one of said machines when the ratio of the loads between the different conductors departs from normal.

2. In a three-wire system of distribution, a source of current, two main conductors, a neutral conductor, a balancer set including two compound-wound dynamo-electric machines connected to said conductors and automatic means for cutting out one of the field windings of one of said dynamo-electric machines when the currents become unbalanced on the two sides of the system.

3. In a multiple voltage system of distribution, a plurality of feeder conductors, a plurality of compound wound dynamo-electric machines connected to said conductors and adapted to act as motors or generators to supply current to the branch or branches of the system which carry the heaviest currents to maintain the voltages at the proper values, and means for automatically short-circuiting the series field of the machine which acts as a motor to drive another machine as a generator when the currents are unbalanced.

4. In a multiple voltage system of distribution, more than two feeder conductors, a balancer consisting of a plurality of compound-wound dynamo-electric machines mechanically connected together and electrically connected to the conductors of the system, and automatic means for rendering inoperative the series field of that machine which drives another as a generator when the currents become unbalanced.

5. In a multiple-voltage system of distribution, more than two conductors, a balancer consisting of a plurality of compound-wound dynamo-electric machines connected to the conductors of the system, and automatic means for transforming that dynamo-machine which acts as a motor to drive another as a generator, from a compound-wound to a shunt wound dynamo-electric machine, when the currents are unequal.

6. In a multiple-voltage system of distribution, more than two conductors, a balancer consisting of a plurality of compound-wound dynamo-electric machines connected to said conductors, and means including a plurality of switches for automatically cutting out of service the series winding of any one of said machines when it acts as a motor to drive another as a generator when the ratio of the loads on the different branches of the system is other than normal.

7. In a three-wire system of distribution, a source of current, two main conductors, a neutral conductor, a balancer set including two dynamo-electric machines connected to the three conductors, series and shunt field windings for said machines and means whereby the series field winding of one of said machines will be cut out of service when the currents on the two sides of the neutral conductor become unbalanced.

8. In a multiple-voltage system of distribution, a source of current, a plurality of conductors including two main conductors and a neutral or balancing conductor, a balancer set including two dynamo-electric machines connected to said conductors for supplying the balancing current, said machines having series and shunt windings, and means for automatically short-circuiting the series winding of the machine on the branch carrying the smaller current when the currents in the branches become unbalanced.

9. In a multiple-voltage system of distribution, a source of current, a plurality of conductors including two main conductors and a neutral or balancing conductor, a balancer comprising two compound-wound dynamo-electric machines connected to said conductors for supplying the balancing current, and means responsive to an unbalancing of the currents for changing the machine on the branch having the smaller current from a compound-wound machine to a shunt wound machine.

10. In a multiple-voltage system of distribution, a plurality of feeder conductors including two main conductors and a compensating or neutral conductor, a balancer including two machines adapted to act as a generator and motor respectively when the currents taken by the different circuits become unequal or unbalanced, series and shunt field windings for said machines, and means responsive to an unbalancing of the currents for short-circuiting the series winding of the machine acting as a motor.

11. In a three-wire system of distribution, two main conductors and a compensating or neutral conductor, a balancer set including two dynamo-electric machines each adapted to act as a motor or generator, depending on which side of the system has the greater current, and means responsive to an unbalancing of the currents for automatically cutting out of service the series winding of the machine then acting as a motor.

12. In a three-wire system of distribution, two main conductors, a compensating or balancing conductor, a main source of current, a balancer set including two dynamo-electric machines adapted to act as motors or generators for supplying the balance of current when the currents are unequal, and automatic means responsive to an unbalancing of the currents for short-circuiting the series winding of either machine when it becomes a motor.

13. In a three-wire system of distribution, two main conductors and a balancing or compensating conductor, a balancer comprising two dynamo-electric machines for supplying the balancing current when the currents are unequal, each of said machines having a series and a shunt-field winding, and means responsive to a passage or reversal of current in the balancing or compensating conductor for cutting out of service the series winding of the motor of said balancer set.

14. In a three-wire system of distribution, two main conductors and a balancing or compensating conductor, a balancer set including two dynamo-electric machines for supplying the balancing current when the currents on the two sides of the system are unequal, each of said machines having a winding in series with its armature and a winding connected across the main conductors in shunt to the armature, and means responsive to a passage of current or reversal of current in the compensating or balancing conductor for automatically short-circuiting the series winding of the machine on the side having the lesser current, and for connecting into circuit the series winding of the other machine.

15. In a three-wire system of distribution, two main conductors and a balancing or compensating conductor, a balancer set including two dynamo-electric machines connected across the main conductors, and each connected to the balancing or compensating conductor, field windings in series with the armatures of said machines, a shunt winding for each machine connected across the main conductors, means including a pair of switches for short-circuiting said series windings, and means for controlling said switches to short-circuit the series winding of the motor of the balancer set when the currents on the two sides of the system are unequal.

16. In a three-wire system of distribution, two main conductors forming the legs of the system and a compensating or balancing conductor, a balancer set including two dynamo-electric machines having armatures and series field windings connected across the legs of the system and connected at a central point of the compensating conductor, a shunt field winding for each machine connected across the legs of the system, means including a pair of switches for short-circuiting the series winding of either machine when acting as a motor, and means including a reverse current relay having a coil connected to the compensating conductor for controlling the short-circuiting switches.

17. In a multiple-voltage system of distribution, a plurality of conductors, a plurality of balancers connected in parallel to the conductors of said system, each of said balancers consisting of a plurality of compound-wound dynamo-electric machines, and automatic means for cutting out of service the series field windings of those machines which act as motors to drive other machines as generators to supply the balancing current when the currents are unequal.

18. In a three-wire system of distribution, two main conductors forming the legs of the system, and a compensating or balancing conductor, a plurality of balancers connected in parallel across the legs of the system and to the compensating or balancing conductor, each balancer comprising two dynamo-electric machines having series and shunt field windings, and means for automatically cutting out of service the series winding of the machines of each set which become motors by the unbalancing of the currents.

19. In a three-wire system of distribution, two main conductors forming the legs of the system, and a compensating or balancing conductor, a plurality of balancers connected in parallel across the legs of the system and to the compensating or balancing conductor, each balancer comprising two dynamo-electric machines, the armatures of which are connected across the legs of the system, series field windings for said machines connected in circuit with the armatures, shunt-field windings connected across the legs of the system, means for short-circuiting the series windings of the machines on either side of the compensating or balancing conductor, and means responsive to an unbalancing of the currents for operating said means to short-circuit the series windings of those machines acting as motors.

In testimony whereof I affix my signature, in the presence of two witnesses.

DAVID HALL.

Witnesses:
ARTHUR F. KROIS,
FRED J. KINSEY.

---

It is hereby certified that in Letters Patent No. 883,195, granted March 31, 1908, upon the application of David Hall, of Norwood, Ohio, for an improvement in "Systems of Distribution," an error appears in the printed specification requiring correction, as follows: In line 124, page 6, the word "of" should read *to;* and that the said Letters Patent should be read with this correction therein that the same may conform to the record of the case in the Patent Office.

Signed and sealed this 28th day of April, A. D., 1908.

C. C. BILLINGS,
*Acting Commisssoner of Patents.*